(12) United States Patent
Hayes et al.

(10) Patent No.: US 11,674,719 B2
(45) Date of Patent: Jun. 13, 2023

(54) $CO_2$ REFRIGERATION SYSTEM WITH AUTOMATED CONTROL OPTIMIZATION

(71) Applicant: Hill Phoenix, Inc., Conyers, GA (US)

(72) Inventors: Niel M. Hayes, Conyers, GA (US); Jeffrey E. Newel, Snellville, GA (US)

(73) Assignee: Hill Phoenix, Inc., Conyers, GA (US)

( * ) Notice: Subject to any disclaimer, the term of this patent is extended or adjusted under 35 U.S.C. 154(b) by 7 days.

(21) Appl. No.: 17/464,321

(22) Filed: Sep. 1, 2021

(65) Prior Publication Data
US 2021/0396433 A1 Dec. 23, 2021

Related U.S. Application Data

(62) Division of application No. 16/429,478, filed on Jun. 3, 2019, now Pat. No. 11,353,246.
(Continued)

(51) Int. Cl.
*F25B 49/02* (2006.01)
*F25B 9/00* (2006.01)
(Continued)

(52) U.S. Cl.
CPC ............... *F25B 9/008* (2013.01); *F25B 1/10* (2013.01); *F25B 41/20* (2021.01); *F25B 49/02* (2013.01);
(Continued)

(58) Field of Classification Search
CPC .... F25B 9/008; F25B 49/027; F25B 2500/19; F25B 2600/01; F25B 2600/111;
(Continued)

(56) References Cited

U.S. PATENT DOCUMENTS

| 5,735,134 A | 4/1998 | Liu et al. |
| 6,578,373 B1 | 6/2003 | Barbier |

(Continued)

FOREIGN PATENT DOCUMENTS

| EP | 2999932 | 3/2016 |
| EP | 3023713 | 5/2016 |

(Continued)

OTHER PUBLICATIONS

WO 2016/084174 (English translation) (Year: 2016).*
(Continued)

*Primary Examiner* — Jonathan Bradford
(74) *Attorney, Agent, or Firm* — Fish & Richardson P.C.

(57) ABSTRACT

A refrigeration system includes a receiver, a gas bypass valve, a parallel compressor, and a controller. The gas bypass valve and the parallel compressor are fluidly coupled to an outlet of the receiver in parallel and configured to control a pressure of a gas refrigerant in the receiver. The controller is configured to switch from operating the gas bypass valve to operating the parallel compressor to control the pressure of the gas refrigerant in the receiver in response to a value of a process variable crossing a switchover setpoint. The value of the process variable depends on an amount of the gas refrigerant produced by the refrigeration system. The controller is configured to automatically adjust the switchover setpoint in response to the amount of the gas refrigerant produced by the refrigeration system being insufficient to sustain operation of the parallel compressor.

20 Claims, 5 Drawing Sheets

Related U.S. Application Data

(60) Provisional application No. 62/683,099, filed on Jun. 11, 2018.

(51) Int. Cl.
    *F25B 1/10*          (2006.01)
    *F25B 41/20*        (2021.01)
    *F25B 5/02*          (2006.01)

(52) U.S. Cl.
CPC .......... *F25B 49/022* (2013.01); *F25B 49/027* (2013.01); *F25B 5/02* (2013.01); *F25B 2400/075* (2013.01); *F25B 2500/19* (2013.01); *F25B 2600/01* (2013.01); *F25B 2600/0251* (2013.01); *F25B 2600/111* (2013.01); *F25B 2600/2501* (2013.01); *F25B 2700/2106* (2013.01); *F25B 2700/21161* (2013.01); *F25B 2700/21163* (2013.01)

(58) Field of Classification Search
CPC .... F25B 2700/2106; F25B 2700/21161; F25B 2700/21163
See application file for complete search history.

(56) References Cited

U.S. PATENT DOCUMENTS

| | | |
|---|---|---|
| 7,114,343 B2 | 10/2006 | Kates |
| 7,599,759 B2 | 10/2009 | Zugibe et al. |
| 7,752,854 B2 | 7/2010 | Singh et al. |
| 2015/0059373 A1 | 3/2015 | Maiello et al. |
| 2016/0102901 A1 | 4/2016 | Christensen et al. |
| 2017/0321941 A1 | 11/2017 | Fredslund et al. |
| 2017/0328604 A1 | 11/2017 | Fredslund et al. |
| 2018/0031292 A1 | 2/2018 | Liu et al. |
| 2018/0283754 A1 | 10/2018 | Prins et al. |
| 2019/0376728 A1 | 12/2019 | Hayes et al. |

FOREIGN PATENT DOCUMENTS

| | | |
|---|---|---|
| WO | WO 2017/023632 | 2/2017 |
| WO | WO 2017/067860 | 4/2017 |

OTHER PUBLICATIONS

Extended European Search Report and Written Opinion regarding EP Application No. 19178441.2 dated Aug. 13, 2019, 8 pps.

Extended European Search Report in European Appln. No. 21192656.3, dated Nov. 8, 2021, 9 pages.

Office Action in Brazilian Appln. No. BR102019011489-4, dated Mar. 21, 2023, 6 pages (with English translation).

* cited by examiner

$CO_2$ REFRIGERATION SYSTEM WITH AUTOMATED CONTROL OPTIMIZATION

CROSS-REFERENCE TO RELATED PATENT APPLICATION

This application is a divisional application of and claims priority to U.S. application Ser. No. 16/429,478, filed on Jun. 3, 2019, which in turn claims the benefit of and priority to U.S. Provisional Patent Application No. 62/683,099 filed Jun. 11, 2018, the entire disclosure of each of which are incorporated by reference herein.

BACKGROUND

The present disclosure relates generally to a refrigeration system and more particularly to a refrigeration system that uses carbon dioxide (i.e., $CO_2$) as a refrigerant. The present disclosure relates more particularly still to a $CO_2$ refrigeration system with automated control optimization.

Refrigeration systems are often used to provide cooling to temperature controlled display devices (e.g. cases, merchandisers, etc.) in supermarkets and other similar facilities. Vapor compression refrigeration systems are a type of refrigeration system which provides such cooling by circulating a fluid refrigerant (e.g., a liquid and/or vapor) through a thermodynamic vapor compression cycle. In a vapor compression cycle, the refrigerant is typically compressed to a high temperature high pressure state (e.g., by a compressor of the refrigeration system), cooled/condensed to a lower temperature state (e.g., in a gas cooler or condenser which absorbs heat from the refrigerant), expanded to a lower pressure (e.g., through an expansion valve), and evaporated to provide cooling by absorbing heat into the refrigerant. $CO_2$ refrigeration systems are a type of vapor compression refrigeration system that use $CO_2$ as a refrigerant.

$CO_2$ refrigeration system components such as parallel compressors and gas coolers are often selected based on design conditions which takes into account the warmest projected climate to which those components are expected to be subject. While it is important to ensure the system and its components will be able to run in these peak extreme conditions, it can be difficult to predict how these components should be optimally controlled under non-design conditions. The components of the $CO_2$ refrigeration system may be subject to non-design conditions for over 95% of its operation time No control information is typically provided for non-design conditions. Instead, a set of generic default setpoints are typically used at the commissioning of the equipment. So long as the system appears to operate successfully under the startup conditions, the setpoint is rarely changed. If the system does not appear to operate successfully, a setpoint either directly or indirectly related may be changed, whether or not it is the correct modification. All changes to setpoints typically require a person to manually observe live or logged historical system performance data and then determine how the setpoints should be adjusted.

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art and is not admitted to be prior art by inclusion in this section.

SUMMARY

One implementation of the present disclosure is a refrigeration system including a receiver, a gas bypass valve, a parallel compressor, and a controller. The receiver is configured to collect a gas refrigerant produced by the refrigeration system and comprising an outlet through which the gas refrigerant exits the receiver. The gas bypass valve is fluidly coupled to the outlet of the receiver and operable to control a pressure of the gas refrigerant in the receiver by controlling a first flow of the gas refrigerant from the receiver through the gas bypass valve. The parallel compressor is fluidly coupled to the outlet of the receiver in parallel with the gas bypass valve and operable to control the pressure of the gas refrigerant in the receiver by compressing a second flow of the gas refrigerant from the receiver and discharging the compressed gas refrigerant into a discharge line. The controller is configured to switch from operating the gas bypass valve to operating the parallel compressor to control the pressure of the gas refrigerant in the receiver in response to a value of a process variable crossing a switchover setpoint. The value of the process variable depends on an amount of the gas refrigerant produced by the refrigeration system. The controller is configured to automatically adjust the switchover setpoint in response to the amount of the gas refrigerant produced by the refrigeration system being insufficient to sustain operation of the parallel compressor.

In some embodiments, the controller is configured to switch from operating the gas bypass valve to operating the parallel compressor to control the pressure of the gas refrigerant in the receiver in response to the value of the process variable exceeding the switchover setpoint for at least a predetermined amount of time.

In some embodiments, automatically adjusting the switchover setpoint includes performing a switchover setpoint adjustment process. The switchover setpoint adjustment process may include switching from operating the parallel compressor to operating the gas bypass valve to control the pressure of the gas refrigerant in the receiver, automatically increasing the switchover setpoint to an adjusted switchover setpoint, switching from operating the gas bypass valve to operating the parallel compressor to control the pressure of the gas refrigerant in the receiver in response to the value of the process variable exceeding the adjusted switchover setpoint, and repeating the switching and automatically increasing steps until the amount of the gas refrigerant produced by the refrigeration system is sufficient to sustain operation of the parallel compressor upon switching to operating the parallel compressor.

In some embodiments, operating the parallel compressor to control the pressure of the gas refrigerant in the receiver includes activating the parallel compressor in response to the pressure of the gas refrigerant in the receiver exceeding a pressure setpoint and deactivating the parallel compressor in response to the pressure of the gas refrigerant in the receiver dropping below the pressure setpoint.

In some embodiments, the controller is configured to start a run delay timer upon switching to operating the parallel compressor to control the pressure of the gas refrigerant in the receiver, execute the activating and deactivating of the parallel compressor one or more times based on the pressure of the gas refrigerant in the receiver relative to the pressure setpoint, monitor a number of times the parallel compressor deactivates before the run delay timer expires, and determine whether the amount of the gas refrigerant produced by the refrigeration system is sufficient to sustain operation of the parallel compressor based on the number of times the parallel compressor deactivates before the run delay timer expires.

In some embodiments, the controller is configured to determine that the amount of the gas refrigerant produced by the refrigeration system is insufficient to sustain operation of the parallel compressor in response to the number of times the parallel compressor deactivates exceeding a threshold number of deactivations.

In some embodiments, the controller is configured to determine that the amount of the gas refrigerant produced by the refrigeration system is sufficient to sustain operation of the parallel compressor in response to the run delay timer expiring before the number of times the parallel compressor deactivates exceeds a threshold number of deactivations.

In some embodiments, the controller is configured to switch from operating the parallel compressor to operating the gas bypass valve to control the pressure of the gas refrigerant in the receiver in response to the pressure of the gas refrigerant in the receiver dropping below a pressure setpoint.

In some embodiments, the controller is configured to start a run delay timer upon switching to operating the parallel compressor to control the pressure of the gas refrigerant in the receiver and determine whether the amount of the gas refrigerant produced by the refrigeration system is sufficient to sustain operation of the parallel compressor based on whether the pressure of the gas refrigerant in the receiver drops below a pressure setpoint before the run delay timer expires.

In some embodiments, the controller is configured to determine that the amount of the gas refrigerant produced by the refrigeration system is insufficient to sustain operation of the parallel compressor in response to the pressure of the gas refrigerant in the receiver dropping below the pressure setpoint before the run delay timer expires.

Another implementation of the present disclosure is a method for operating a refrigeration system. The method includes collecting a gas refrigerant produced by the refrigeration system in a receiver. The receiver includes an outlet through which the gas refrigerant exits the receiver. The method includes operating a gas bypass valve fluidly coupled to the outlet of the receiver to control a pressure of the gas refrigerant in the receiver by controlling a first flow of the gas refrigerant from the receiver through the gas bypass valve. The method includes operating a parallel compressor fluidly coupled to the outlet of the receiver in parallel with the gas bypass valve to control the pressure of the gas refrigerant in the receiver by compressing a second flow of the gas refrigerant from the receiver and discharging the compressed gas refrigerant into a discharge line. The method includes switching from operating the gas bypass valve to operating the parallel compressor to control the pressure of the gas refrigerant in the receiver in response to a value of a process variable crossing a switchover setpoint. The value of the process variable depends on an amount of the gas refrigerant produced by the refrigeration system. The method includes automatically adjusting the switchover setpoint in response to the amount of the gas refrigerant produced by the refrigeration system being insufficient to sustain operation of the parallel compressor.

In some embodiments, the method includes switching from operating the gas bypass valve to operating the parallel compressor to control the pressure of the gas refrigerant in the receiver in response to the value of the process variable exceeding the switchover setpoint for at least a predetermined amount of time.

In some embodiments, automatically adjusting the switchover setpoint includes performing a switchover setpoint adjustment process. The switchover setpoint adjustment process may include switching from operating the parallel compressor to operating the gas bypass valve to control the pressure of the gas refrigerant in the receiver, automatically increasing the switchover setpoint to an adjusted switchover setpoint, switching from operating the gas bypass valve to operating the parallel compressor to control the pressure of the gas refrigerant in the receiver in response to the value of the process variable exceeding the adjusted switchover setpoint, and repeating the switching and automatically increasing steps until the amount of the gas refrigerant produced by the refrigeration system is sufficient to sustain operation of the parallel compressor upon switching to operating the parallel compressor.

In some embodiments, operating the parallel compressor to control the pressure of the gas refrigerant in the receiver includes activating the parallel compressor in response to the pressure of the gas refrigerant in the receiver exceeding a pressure setpoint and deactivating the parallel compressor in response to the pressure of the gas refrigerant in the receiver dropping below the pressure setpoint.

In some embodiments, the method includes starting a run delay timer upon switching to operating the parallel compressor to control the pressure of the gas refrigerant in the receiver, executing the activating and deactivating of the parallel compressor one or more times based on the pressure of the gas refrigerant in the receiver relative to the pressure setpoint, monitoring a number of times the parallel compressor deactivates before the run delay timer expires, and determining whether the amount of the gas refrigerant produced by the refrigeration system is sufficient to sustain operation of the parallel compressor based on the number of times the parallel compressor deactivates before the run delay timer expires.

In some embodiments, the method includes determining that the amount of the gas refrigerant produced by the refrigeration system is insufficient to sustain operation of the parallel compressor in response to the number of times the parallel compressor deactivates exceeding a threshold number of deactivations.

In some embodiments, the method includes determining that the amount of the gas refrigerant produced by the refrigeration system is sufficient to sustain operation of the parallel compressor in response to the run delay timer expiring before the number of times the parallel compressor deactivates exceeds a threshold number of deactivations.

In some embodiments, the method includes switching from operating the parallel compressor to operating the gas bypass valve to control the pressure of the gas refrigerant in the receiver in response to the pressure of the gas refrigerant in the receiver dropping below a pressure setpoint.

In some embodiments, the method includes starting a run delay timer upon switching to operating the parallel compressor to control the pressure of the gas refrigerant in the receiver and determining whether the amount of the gas refrigerant produced by the refrigeration system is sufficient to sustain operation of the parallel compressor based on whether the pressure of the gas refrigerant in the receiver drops below a pressure setpoint before the run delay timer expires.

In some embodiments, the method includes determining that the amount of the gas refrigerant produced by the refrigeration system is insufficient to sustain operation of the parallel compressor in response to the pressure of the gas refrigerant in the receiver dropping below the pressure setpoint before the run delay timer expires.

Another implementation of the present disclosure is a refrigeration system including a gas cooler/condenser, a fan, and a controller. The gas cooler/condenser is configured to remove heat from a refrigerant flowing through the gas cooler/condenser and comprising an outlet through which the refrigerant exits the gas cooler/condenser. The fan is operable to cause airflow across the gas cooler/condenser and configured to operate at multiple different fan speeds to modulate an amount of heat removed the refrigerant flowing through the gas cooler/condenser. The controller is configured to calculate a condenser approach temperature based on a temperature of the refrigerant exiting the gas cooler/condenser and a temperature of the airflow caused by the fan, operate the fan to modulate the amount of heat removed from the refrigerant flowing through the gas cooler/condenser to maintain the condenser approach temperature at or below a condenser approach setpoint, and automatically adjust the condenser approach setpoint in response to the amount of heat removed from the refrigerant being insufficient to maintain the condenser approach temperature at or below the condenser approach setpoint.

In some embodiments, the controller is configured to calculate the condenser approach temperature by subtracting the temperature of the airflow caused by the fan from the temperature of the refrigerant exiting the gas cooler/condenser In some embodiments, automatically adjusting the condenser approach setpoint includes performing an approach setpoint adjustment process. The approach setpoint adjustment process may include starting a condenser approach subroutine timer, monitoring the condenser approach temperature and a fan speed of the fan after starting the condenser approach subroutine timer, automatically increasing the condenser approach setpoint to an adjusted condenser approach setpoint in response to the condenser approach temperature and the fan speed failing to maintain predetermined conditions for at least a minimum amount of time before the condenser approach subroutine timer expires, and repeating the starting, monitoring, and automatically increasing steps until the condenser approach temperature and the fan speed maintain the predetermined conditions for at least the minimum amount of time before the condenser approach subroutine timer expires.

In some embodiments, the predetermined conditions include at least one of the condenser approach temperature being less than the condenser approach setpoint, the fan speed being less than a fan speed setpoint, and the fan speed being between a low deadband value and a high deadband value.

In some embodiments, the approach setpoint adjustment process includes writing the adjusted condenser approach setpoint as an optimum condenser approach setpoint in response to the condenser approach temperature and the fan speed maintaining the predetermined conditions for at least the minimum amount of time.

In some embodiments, the approach setpoint adjustment process further includes determining whether the adjusted condenser approach setpoint exceeds a maximum approach setpoint after automatically increasing the condenser approach setpoint to the adjusted condenser approach setpoint and restarting the condenser approach subroutine timer in response to the adjusted condenser approach setpoint not exceeding the maximum approach setpoint.

In some embodiments, the approach setpoint adjustment process further includes terminating the approach setpoint adjustment process in response to the condenser approach subroutine timer in response to the adjusted condenser approach setpoint exceeding the maximum approach setpoint.

In some embodiments, the controller is configured to determine whether the gas cooler/condenser is operating in a subcritical mode and execute the approach setpoint adjustment process in response to determining that the gas cooler/condenser is operating in the subcritical mode.

In some embodiments, the controller is configured to obtain a measurement of an ambient air temperature that occurs while automatically adjusting the condenser approach setpoint and store an association between the condenser approach setpoint that results from automatically adjusting the condenser approach setpoint and the measured ambient air temperature.

In some embodiments, the controller is configured to, in response to a current ambient air temperature matching the measured ambient air temperature associated with the condenser approach setpoint, start a condenser approach verification subroutine timer, monitor the condenser approach temperature and a fan speed of the fan, and verify that the condenser approach temperature and the fan speed maintain predetermined conditions for at least a minimum amount of time before the condenser approach verification subroutine timer expires.

Another implementation of the present disclosure is a method for operating a refrigeration system. The method includes removing heat from a refrigerant flowing through a gas cooler/condenser. The gas cooler/condenser includes an outlet through which the refrigerant exits the gas cooler/condenser. The method includes operating a fan to cause airflow across the gas cooler/condenser. The fan can operate at multiple different fan speeds to modulate an amount of heat removed the refrigerant flowing through the gas cooler/condenser. The method includes calculating a condenser approach temperature based on a temperature of the refrigerant exiting the gas cooler/condenser and a temperature of the airflow caused by the fan, operating the fan to modulate the amount of heat removed from the refrigerant flowing through the gas cooler/condenser to maintain the condenser approach temperature at or below a condenser approach setpoint, and automatically adjusting the condenser approach setpoint in response to the amount of heat removed from the refrigerant being insufficient to maintain the condenser approach temperature at or below the condenser approach setpoint.

In some embodiments, the method includes calculating the condenser approach temperature by subtracting the temperature of the airflow caused by the fan from the temperature of the refrigerant exiting the gas cooler/condenser In some embodiments, automatically adjusting the condenser approach setpoint includes performing an approach setpoint adjustment process. The approach setpoint adjustment process may include starting a condenser approach subroutine timer, monitoring the condenser approach temperature and a fan speed of the fan after starting the condenser approach subroutine timer, automatically increasing the condenser approach setpoint to an adjusted condenser approach setpoint in response to the condenser approach temperature and the fan speed failing to maintain predetermined conditions for at least a minimum amount of time before the condenser approach subroutine timer expires, and repeating the starting, monitoring, and automatically increasing steps until the condenser approach temperature and the fan speed maintain the predetermined conditions for at least the minimum amount of time before the condenser approach subroutine timer expires.

In some embodiments, the predetermined conditions include at least one of the condenser approach temperature being less than the condenser approach setpoint, the fan speed being less than a fan speed setpoint, and the fan speed being between a low deadband value and a high deadband value.

In some embodiments, the approach setpoint adjustment process includes writing the adjusted condenser approach setpoint as an optimum condenser approach setpoint in response to the condenser approach temperature and the fan speed maintaining the predetermined conditions for at least the minimum amount of time.

In some embodiments, the approach setpoint adjustment process further includes determining whether the adjusted condenser approach setpoint exceeds a maximum approach setpoint after automatically increasing the condenser approach setpoint to the adjusted condenser approach setpoint and restarting the condenser approach subroutine timer in response to the adjusted condenser approach setpoint not exceeding the maximum approach setpoint.

In some embodiments, the approach setpoint adjustment process further includes terminating the approach setpoint adjustment process in response to the condenser approach subroutine timer in response to the adjusted condenser approach setpoint exceeding the maximum approach setpoint.

In some embodiments, the method includes determining whether the gas cooler/condenser is operating in a subcritical mode and executing the approach setpoint adjustment process in response to determining that the gas cooler/condenser is operating in the subcritical mode.

In some embodiments, the method includes obtaining a measurement of an ambient air temperature that occurs while automatically adjusting the condenser approach setpoint and storing an association between the condenser approach setpoint that results from automatically adjusting the condenser approach setpoint and the measured ambient air temperature.

In some embodiments, the method includes, in response to a current ambient air temperature matching the measured ambient air temperature associated with the condenser approach setpoint, starting a condenser approach verification subroutine timer, monitoring the condenser approach temperature and a fan speed of the fan, and verifying that the condenser approach temperature and the fan speed maintain predetermined conditions for at least a minimum amount of time before the condenser approach verification subroutine timer expires.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION $CO_2$ Refrigeration System

Referring generally to the FIGURES, a $CO_2$ refrigeration system is shown, according to various exemplary embodiments. The $CO_2$ refrigeration system may be a vapor compression refrigeration system which uses primarily carbon dioxide (i.e., $CO_2$) as a refrigerant. In some implementations, the $CO_2$ refrigeration system is used to provide cooling for temperature controlled display devices in a supermarket or other similar facility.

Figure 1:
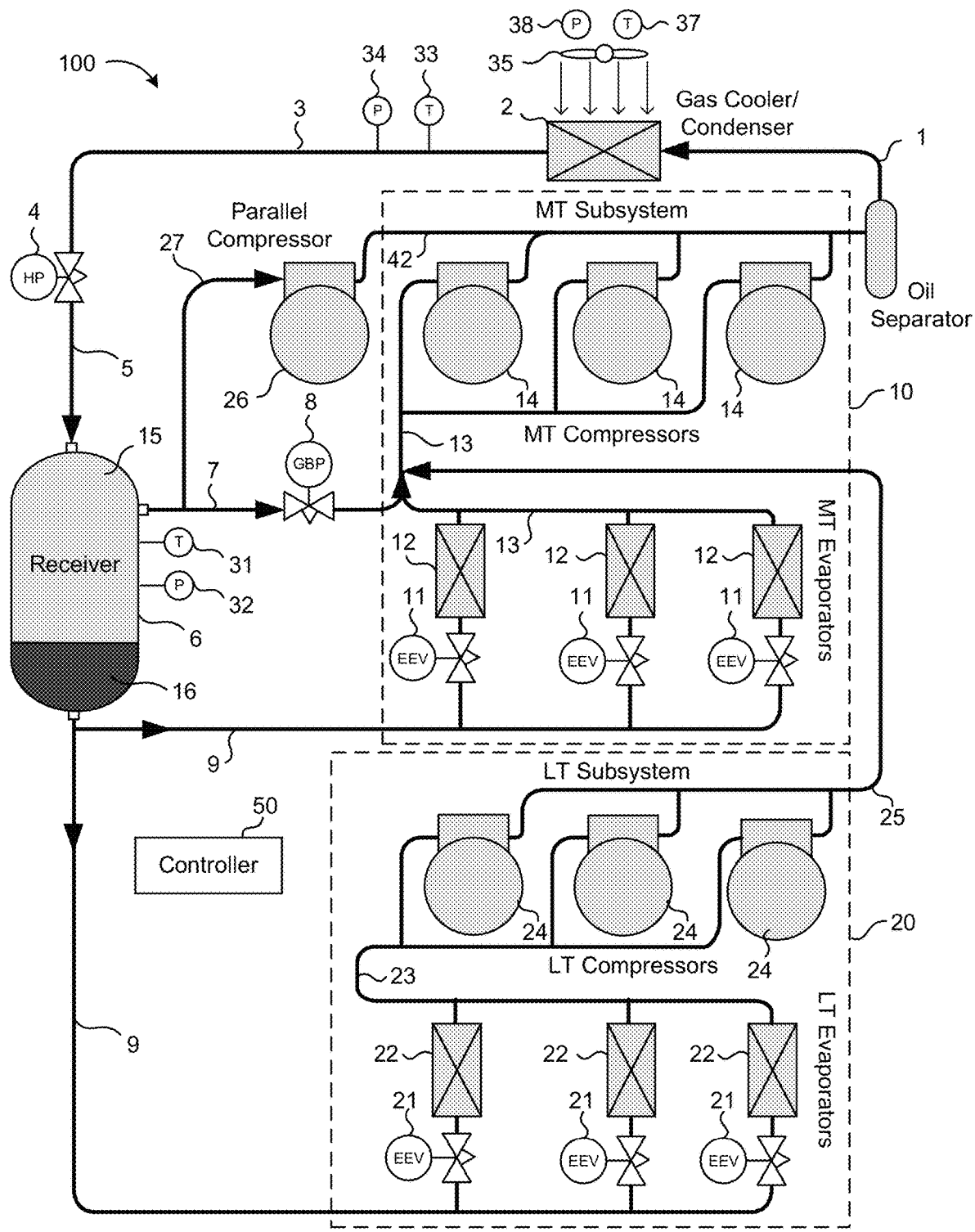
FIG. 1 is a block diagram of a $CO_2$ refrigeration system, according to an exemplary embodiment.

Referring now to FIG. 1, a $CO_2$ refrigeration system 100 is shown, according to an exemplary embodiment. $CO_2$ refrigeration system 100 may be a vapor compression refrigeration system which uses primarily carbon dioxide ($CO_2$) as a refrigerant. However, it is contemplated that other refrigerants can be substituted for $CO_2$ without departing from the teachings of the present disclosure. $CO_2$ refrigeration system 100 and is shown to include a system of pipes, conduits, or other fluid channels (e.g., fluid conduits 1, 3, 5, 7, 9, 13, 23, 25, 27, and 42) for transporting the $CO_2$ refrigerant between various components of $CO_2$ refrigeration system 100. The components of $CO_2$ refrigeration system 100 are shown to include a gas cooler/condenser 2, a high pressure valve 4, a receiver 6, a gas bypass valve 8, a medium-temperature ("MT") subsystem 10, and a low-temperature ("LT") subsystem 20.

Gas cooler/condenser 2 may be a heat exchanger or other similar device for removing heat from the $CO_2$ refrigerant. Gas cooler/condenser 2 is shown receiving $CO_2$ gas from fluid conduit 1. In some embodiments, the $CO_2$ gas in fluid conduit 1 may have a pressure within a range from approximately 45 bar to approximately 100 bar (i.e., about 650 psig to about 1450 psig), depending on ambient temperature and other operating conditions. In some embodiments, gas cooler/condenser 2 may partially or fully condense $CO_2$ gas into liquid $CO_2$ (e.g., if system operation is in a subcritical region). The condensation process may result in fully saturated $CO_2$ liquid or a two-phase liquid-vapor mixture (e.g., having a thermodynamic vapor quality between 0 and 1). In other embodiments, gas cooler/condenser 2 may cool the $CO_2$ gas (e.g., by removing superheat) without condensing the $CO_2$ gas into $CO_2$ liquid (e.g., if system operation is in a supercritical region). In some embodiments, the cooling/condensation process is an isobaric process. Gas cooler/condenser 2 is shown outputting the cooled and/or condensed $CO_2$ refrigerant into fluid conduit 3.

In some embodiments, $CO_2$ refrigeration system 100 includes a temperature sensor 33 and a pressure sensor 34 configured to measure the temperature and pressure of the $CO_2$ refrigerant exiting gas cooler/condenser 2. Sensors 33 and 34 can be installed along fluid conduit 3 (as shown in FIG. 1), within gas cooler/condenser 2, or otherwise positioned to measure the temperature and pressure of the $CO_2$ refrigerant exiting gas cooler/condenser 2. In some embodiments, $CO_2$ refrigeration system 100 includes a condenser fan 35 configured to provide airflow across gas cooler/condenser 2. The speed of condenser fan 35 can be controlled to increase or decrease the airflow across gas cooler/condenser 2 to modulate the amount of cooling applied to the $CO_2$ refrigerant within gas cooler/condenser 2. In some embodiments, $CO_2$ refrigeration system 100 also includes a temperature sensor 37 and/or a pressure sensor 38 configured to measure the temperature and/or pressure of the ambient air that flows across gas cooler/condenser 2 to provide cooling for the $CO_2$ refrigerant contained therein.

High pressure valve 4 receives the cooled and/or condensed $CO_2$ refrigerant from fluid conduit 3 and outputs the $CO_2$ refrigerant to fluid conduit 5. High pressure valve 4 may control the pressure of the $CO_2$ refrigerant in gas cooler/condenser 2 by controlling an amount of $CO_2$ refrigerant permitted to pass through high pressure valve 4. In some embodiments, high pressure valve 4 is a high pressure thermal expansion valve (e.g., if the pressure in fluid conduit 3 is greater than the pressure in fluid conduit 5). In such embodiments, high pressure valve 4 may allow the $CO_2$ refrigerant to expand to a lower pressure state. The expansion process may be an isenthalpic and/or adiabatic expansion process, resulting in a two-phase flash of the high pressure $CO_2$ refrigerant to a lower pressure, lower temperature state. The expansion process may produce a liquid/vapor mixture (e.g., having a thermodynamic vapor quality between 0 and 1). In some embodiments, the $CO_2$ refrigerant expands to a pressure of approximately 38 bar (e.g., about 550 psig), which corresponds to a temperature of approximately 40° F. The $CO_2$ refrigerant then flows from fluid conduit 5 into receiver 6.

Receiver 6 collects the $CO_2$ refrigerant from fluid conduit 5. In some embodiments, receiver 6 may be a flash tank or other fluid reservoir. Receiver 6 includes a $CO_2$ liquid portion 16 and a $CO_2$ vapor portion 15 and may contain a partially saturated mixture of $CO_2$ liquid and $CO_2$ vapor. In some embodiments, receiver 6 separates the $CO_2$ liquid from the $CO_2$ vapor. The $CO_2$ liquid may exit receiver 6 through fluid conduits 9. Fluid conduits 9 may be liquid headers leading to MT subsystem 10 and/or LT subsystem 20. The $CO_2$ vapor may exit receiver 6 through fluid conduit 7 (i.e., a refrigerant supply line). Fluid conduit 7 is shown leading the $CO_2$ vapor to a gas bypass valve 8 and a parallel compressor 26 (described in greater detail below). In some embodiments, $CO_2$ refrigeration system 100 includes a temperature sensor 31 and a pressure sensor 32 configured to measure the temperature and pressure within receiver 6. Sensors 31 and 32 can be installed in or on receiver 6 (as shown in FIG. 1) or along any of the fluid conduits that contain $CO_2$ refrigerant at the same temperature and/or pressure as receiver 6 (i.e., fluid conduits 5, 7, 9, or 27).

Still referring to FIG. 1, MT subsystem 10 is shown to include one or more expansion valves 11, one or more MT evaporators 12, and one or more MT compressors 14. In various embodiments, any number of expansion valves 11, MT evaporators 12, and MT compressors 14 may be present. Expansion valves 11 may be electronic expansion valves or other similar expansion valves. Expansion valves 11 are shown receiving liquid $CO_2$ refrigerant from fluid conduit 9 and outputting the $CO_2$ refrigerant to MT evaporators 12. Expansion valves 11 may cause the $CO_2$ refrigerant to undergo a rapid drop in pressure, thereby expanding the $CO_2$ refrigerant to a lower pressure, lower temperature two-phase state. In some embodiments, expansion valves 11 may expand the $CO_2$ refrigerant to a pressure of approximately 20 bar to 25 bar. The expansion process may be an isenthalpic and/or adiabatic expansion process.

MT evaporators 12 are shown receiving the cooled and expanded $CO_2$ refrigerant from expansion valves 11. In some embodiments, MT evaporators may be associated with display cases/devices (e.g., if $CO_2$ refrigeration system 100 is implemented in a supermarket setting). MT evaporators 12 may be configured to facilitate the transfer of heat from the display cases/devices into the $CO_2$ refrigerant. The added heat may cause the $CO_2$ refrigerant to evaporate partially or completely. According to one embodiment, the $CO_2$ refrigerant is fully evaporated in MT evaporators 12. In some embodiments, the evaporation process may be an isobaric process. MT evaporators 12 are shown outputting the $CO_2$ refrigerant via suction line 13, leading to MT compressors 14.

MT compressors 14 compress the $CO_2$ refrigerant into a superheated gas having a pressure within a range of approximately 45 bar to approximately 100 bar. The output pressure from MT compressors 14 may vary depending on ambient temperature and other operating conditions. In some embodiments, MT compressors 14 operate in a transcritical mode. In operation, the $CO_2$ discharge gas exits MT compressors 14 and flows through fluid conduit 1 into gas cooler/condenser 2.

Still referring to FIG. 1, LT subsystem 20 is shown to include one or more expansion valves 21, one or more LT evaporators 22, and one or more LT compressors 24. In various embodiments, any number of expansion valves 21, LT evaporators 22, and LT compressors 24 may be present. In some embodiments, LT subsystem 20 may be omitted and the $CO_2$ refrigeration system 100 may operate with an AC module or parallel compressor 26 interfacing with only MT subsystem 10.

Expansion valves 21 may be electronic expansion valves or other similar expansion valves. Expansion valves 21 are shown receiving liquid $CO_2$ refrigerant from fluid conduit 9 and outputting the $CO_2$ refrigerant to LT evaporators 22. Expansion valves 21 may cause the $CO_2$ refrigerant to undergo a rapid drop in pressure, thereby expanding the $CO_2$ refrigerant to a lower pressure, lower temperature two-phase state. The expansion process may be an isenthalpic and/or adiabatic expansion process. In some embodiments, expansion valves 21 may expand the $CO_2$ refrigerant to a lower pressure than expansion valves 11, thereby resulting in a lower temperature $CO_2$ refrigerant. Accordingly, LT subsystem 20 may be used in conjunction with a freezer system or other lower temperature display cases.

LT evaporators 22 are shown receiving the cooled and expanded $CO_2$ refrigerant from expansion valves 21. In some embodiments, LT evaporators may be associated with display cases/devices (e.g., if $CO_2$ refrigeration system 100 is implemented in a supermarket setting). LT evaporators 22 may be configured to facilitate the transfer of heat from the display cases/devices into the $CO_2$ refrigerant. The added heat may cause the $CO_2$ refrigerant to evaporate partially or completely. In some embodiments, the evaporation process may be an isobaric process. LT evaporators 22 are shown outputting the $CO_2$ refrigerant via suction line 23, leading to LT compressors 24.

LT compressors 24 compress the $CO_2$ refrigerant. In some embodiments, LT compressors 24 may compress the $CO_2$ refrigerant to a pressure of approximately 30 bar (e.g., about 450 psig) having a saturation temperature of approximately 23° F. In some embodiments, LT compressors 24 operate in a subcritical mode. LT compressors 24 are shown outputting the $CO_2$ refrigerant through discharge line 25. Discharge line 25 may be fluidly connected with the suction (e.g., upstream) side of MT compressors 14.

Still referring to FIG. 1, $CO_2$ refrigeration system 100 is shown to include a gas bypass valve 8. Gas bypass valve 8 may receive the $CO_2$ vapor from fluid conduit 7 and output the $CO_2$ refrigerant to MT subsystem 10. In some embodiments, gas bypass valve 8 is arranged in series with MT compressors 14. In other words, $CO_2$ vapor from receiver 6 may pass through both gas bypass valve 8 and MT compressors 14. MT compressors 14 may compress the $CO_2$ vapor passing through gas bypass valve 8 from a low pressure state (e.g., approximately 30 bar or lower) to a high pressure state (e.g., 45-100 bar).

Gas bypass valve 8 may be positioned along fluid conduit 7 (i.e., a refrigerant supply line) or fluidly coupled to fluid conduit 7 such that gas bypass valve 8 is arranged in series with MT compressors 14 (upstream of MT compressors 14). Gas bypass valve 8 can be operated to control a flow of gas refrigerant from fluid conduit 7 into suction line 13. Gas bypass valve 8 may be operated to regulate or control the pressure within receiver 6 (e.g., by adjusting an amount of $CO_2$ refrigerant permitted to pass through gas bypass valve 8). For example, gas bypass valve 8 may be adjusted (e.g., variably opened or closed) to adjust the mass flow rate, volume flow rate, or other flow rates of the $CO_2$ refrigerant through gas bypass valve 8. Gas bypass valve 8 may be opened and closed (e.g., manually, automatically, by a controller, etc.) as needed to regulate the pressure within receiver 6.

In some embodiments, gas bypass valve 8 includes a sensor for measuring a flow rate (e.g., mass flow, volume flow, etc.) of the $CO_2$ refrigerant through gas bypass valve 8. In other embodiments, gas bypass valve 8 includes an indicator (e.g., a gauge, a dial, etc.) from which the position of gas bypass valve 8 may be determined. This position may be used to determine the flow rate of $CO_2$ refrigerant through gas bypass valve 8, as such quantities may be proportional or otherwise related.

In some embodiments, gas bypass valve 8 may be a thermal expansion valve (e.g., if the pressure on the downstream side of gas bypass valve 8 is lower than the pressure in fluid conduit 7). According to one embodiment, the pressure within receiver 6 is regulated by gas bypass valve 8 to a pressure of approximately 38 bar, which corresponds to about 37° F. Advantageously, this pressure/temperature state may facilitate the use of copper tubing/piping for the downstream $CO_2$ lines of the system. Additionally, this pressure/temperature state may allow such copper tubing to operate in a substantially frost-free manner.

In some embodiments, the $CO_2$ vapor that is bypassed through gas bypass valve 8 is mixed with the $CO_2$ refrigerant gas exiting MT evaporators 12 (e.g., via suction line 13). The bypassed $CO_2$ vapor may also mix with the discharge $CO_2$ refrigerant gas exiting LT compressors 24 (e.g., via discharge line 25). The combined $CO_2$ refrigerant gas may be provided to the suction side of MT compressors 14.

In some embodiments, the pressure immediately downstream of gas bypass valve 8 (i.e., in suction line 13) is lower than the pressure immediately upstream of gas bypass valve 8 (i.e., in fluid conduit 7). Therefore, the $CO_2$ vapor passing through gas bypass valve 8 and MT compressors 14 may be expanded (e.g., when passing through gas bypass valve 8) and subsequently recompressed (e.g., by MT compressors 14). This expansion and recompression may occur without any intermediate transfers of heat to or from the $CO_2$ refrigerant, which can be characterized as an inefficient energy usage.

Still referring to FIG. 1, $CO_2$ refrigeration system 100 is shown to include a parallel compressor 26. Parallel compressor 26 may be arranged in parallel with MT compressors 14 and arranged in series with LT compressors 24. Although only one parallel compressor 26 is shown, any number of parallel compressors may be present. Parallel compressor 26 may be fluidly connected with receiver 6 and/or fluid conduit 7 via a connecting line 27. Parallel compressor 26 may be used to draw non-condensed $CO_2$ vapor from receiver 6 as a means for pressure control and regulation. Advantageously, using parallel compressor 26 to effectuate pressure control and regulation may provide a more efficient alternative to traditional pressure regulation techniques such as bypassing $CO_2$ vapor through bypass valve 8 to the lower pressure suction side of MT compressors 14.

In some embodiments, parallel compressor 26 may be operated (e.g., by a controller 50) to achieve a desired pressure within receiver 6. For example, controller 50 may receive pressure measurements from a pressure sensor 32 monitoring the pressure within receiver 6 and may activate or deactivate parallel compressor 26 based on the pressure measurements. When active, parallel compressor 26 compresses the $CO_2$ vapor received via connecting line 27 and discharges the compressed gas into discharge line 42. Discharge line 42 may be fluidly connected with fluid conduit 1. Accordingly, parallel compressor 26 may operate in parallel with MT compressors 14 by discharging the compressed $CO_2$ gas into a shared fluid conduit (e.g., fluid conduit 1).

Parallel compressor 26 may be arranged in parallel with both gas bypass valve 8 and with MT compressors 14. $CO_2$ vapor exiting receiver 6 may pass through either parallel compressor 26 or the series combination of gas bypass valve 8 and MT compressors 14. Parallel compressor 26 may receive the $CO_2$ vapor at a relatively higher pressure (e.g., from fluid conduit 7) than the $CO_2$ vapor received by MT compressors 14 (e.g., from suction line 13). This differential in pressure may correspond to the pressure differential across gas bypass valve 8. In some embodiments, parallel compressor 26 may require less energy to compress an equivalent amount of $CO_2$ vapor to the high pressure state (e.g., in fluid conduit 1) as a result of the higher pressure of $CO_2$ vapor entering parallel compressor 26. Therefore, the parallel route including parallel compressor 26 may be a more efficient alternative to the route including gas bypass valve 8 and MT compressors 14.

In some embodiments, gas bypass valve 8 is omitted and the pressure within receiver 6 is regulated using parallel compressor 26. In other embodiments, parallel compressor 26 is omitted and the pressure within receiver 6 is regulated using gas bypass valve 8. In other embodiments, both gas bypass valve 8 and parallel compressor 26 are used to regulate the pressure within receiver 6. All such variations are within the scope of the present disclosure.

Controller

Figure 2:
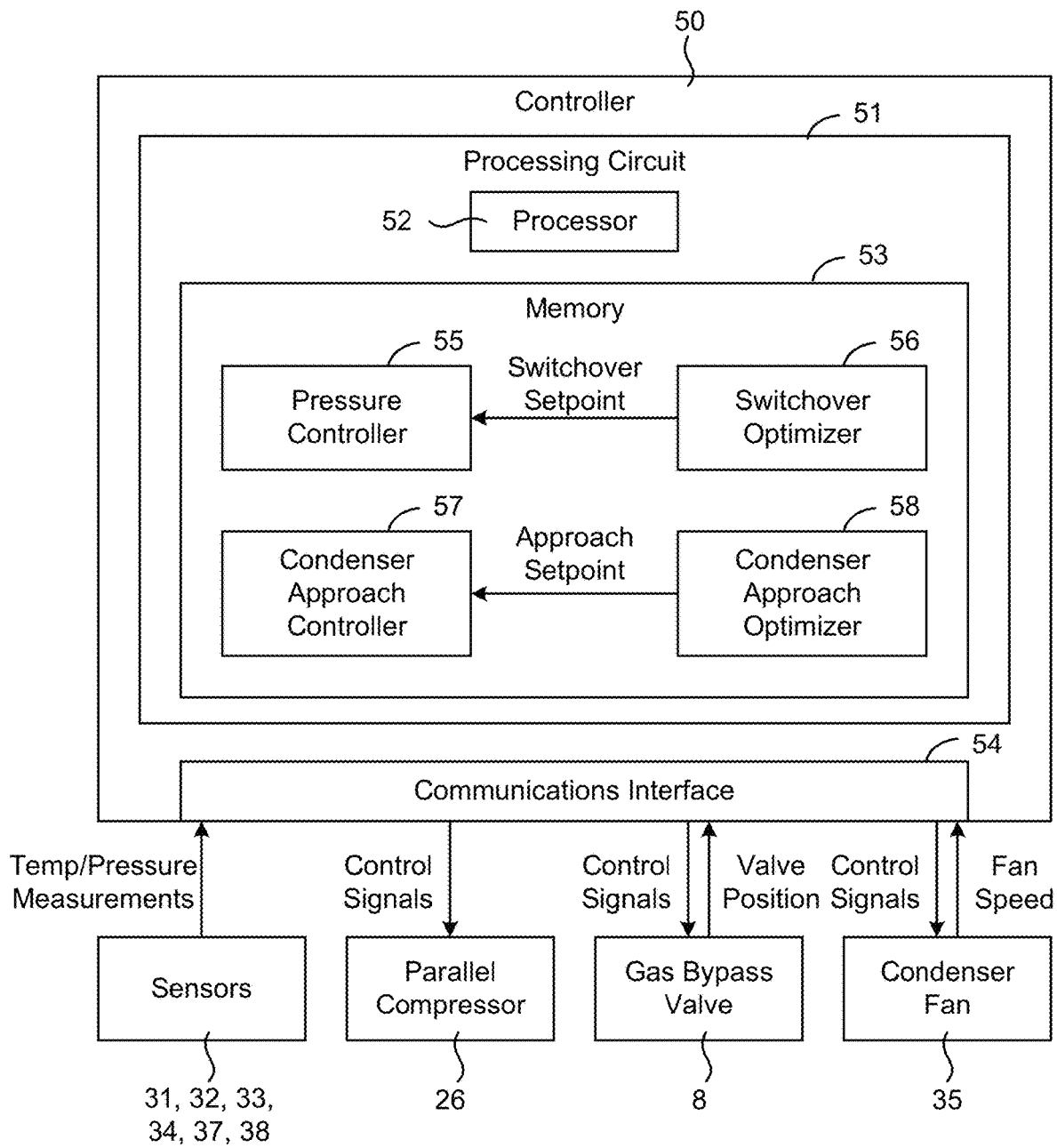
FIG. 2 is a block diagram of a controller configured to control the $CO_2$ refrigeration system of FIG. 1, according to an exemplary embodiment.

Referring now to FIG. 2, a block diagram illustrating controller 50 in greater detail is shown, according to an exemplary embodiment. Controller 50 may receive signals from one or more measurement devices (e.g., pressure sensors, temperature sensors, flow sensors, etc.) located within $CO_2$ refrigeration system 100. For example, controller 50 is shown receiving temperature and pressure measurements from sensors 31-34 and 37-38, a valve position signal from gas bypass valve 8, and a fan speed signal from condenser fan 35. Controller 50 may use the input signals to determine appropriate control actions for controllable devices of $CO_2$ refrigeration system 100 (e.g., compressors 14 and 24, parallel compressor 26, condenser fan 35, valves 4, 8, 11, and 21, flow diverters, power supplies, etc.). For example, controller 50 is shown providing control signals to parallel compressor 26, gas bypass valve 8, and condenser fan 35.

In some embodiments, controller 50 is configured to operate gas bypass valve 8 and/or parallel compressor 26 to maintain the $CO_2$ pressure within receiving tank 6 at a desired setpoint or within a desired range. In some embodiments, controller 50 operates gas bypass valve 8 and parallel compressor 26 based on the temperature of the $CO_2$ refrigerant at the outlet of gas cooler/condenser 2. In other embodiments, controller 50 operates gas bypass valve 8 and parallel compressor 26 based a flow rate (e.g., mass flow, volume flow, etc.) of $CO_2$ refrigerant through gas bypass valve 8. Controller 50 may use a valve position of gas bypass valve 8 as a proxy for $CO_2$ refrigerant flow rate. In some embodiments, controller 50 operates high pressure valve 4 and expansion valves 11 and 21 to regulate the flow of refrigerant in system 100.

Controller 50 may include feedback control functionality for adaptively operating the various components of $CO_2$ refrigeration system 100. For example, controller 50 may receive a setpoint (e.g., a temperature setpoint, a pressure setpoint, a flow rate setpoint, a power usage setpoint, etc.) and operate one or more components of system 100 to achieve the setpoint. The setpoint may be specified by a user (e.g., via a user input device, a graphical user interface, a local interface, a remote interface, etc.) or automatically determined by controller 50 based on a history of data measurements. In some embodiments, controller 50 includes some or all of the features of the controller described in P.C.T. Patent Application No. PCT/US2016/044164 filed Jul. 27, 2016, the entire disclosure of which is incorporated by reference herein.

Controller 50 may be a proportional-integral (PI) controller, a proportional-integral-derivative (PID) controller, a pattern recognition adaptive controller (PRAC), a model recognition adaptive controller (MRAC), a model predictive controller (MPC), or any other type of controller employing any type of control functionality. In some embodiments, controller 50 is a local controller for $CO_2$ refrigeration system 100. In other embodiments, controller 50 is a supervisory controller for a plurality of controlled subsystems (e.g., a refrigeration system, an AC system, a lighting system, a security system, etc.). For example, controller 50 may be a controller for a comprehensive building management system incorporating $CO_2$ refrigeration system 100. Controller 50 may be implemented locally, remotely, or as part of a cloud-hosted suite of building management applications.

Still referring to FIG. 2, controller 50 is shown to include a communications interface 54 and a processing circuit 51. Communications interface 54 can be or include wired or wireless interfaces (e.g., jacks, antennas, transmitters, receivers, transceivers, wire terminals, etc.) for conducting electronic data communications. For example, communications interface 54 may be used to conduct communications with gas bypass valve 8, parallel compressor 26, compressors 14 and 24, high pressure valve 4, various data acquisition devices within $CO_2$ refrigeration system 100 (e.g., temperature sensors, pressure sensors, flow sensors, etc.) and/or other external devices or data sources. Data communications may be conducted via a direct connection (e.g., a wired connection, an ad-hoc wireless connection, etc.) or a network connection (e.g., an Internet connection, a LAN, WAN, or WLAN connection, etc.). For example, communications interface 54 can include an Ethernet card and port for sending and receiving data via an Ethernet-based communications link or network. In another example, communications interface 54 can include a Wi-Fi transceiver or a cellular or mobile phone transceiver for communicating via a wireless communications network.

Processing circuit 51 is shown to include a processor 52 and memory 53. Processor 52 can be implemented as a general purpose processor, an application specific integrated circuit (ASIC), one or more field programmable gate arrays (FPGAs), a group of processing components, a microcontroller, or other suitable electronic processing components. Memory 53 (e.g., memory device, memory unit, storage device, etc.) may be one or more devices (e.g., RAM, ROM, solid state memory, hard disk storage, etc.) for storing data and/or computer code for completing or facilitating the various processes, layers and modules described in the present application. Memory 53 may be or include volatile memory or non-volatile memory. Memory 53 may include database components, object code components, script components, or any other type of information structure for supporting the various activities and information structures described in the present application. According to an exemplary embodiment, memory 53 is communicably connected to processor 52 via processing circuit 51 and includes computer code for executing (e.g., by processing circuit 51 and/or processor 52) one or more processes or control features described herein.

Still referring to FIG. 2, controller 50 is shown to include a pressure controller 55. Pressure controller 55 can be configured to control the pressure within receiver 6 by operating gas bypass valve 8 and/or parallel compressor 26. Pressure controller 55 may use parallel compressor 26 to control the pressure within receiver 6 when the amount of $CO_2$ refrigerant gas being produced by $CO_2$ refrigeration system 100 is sufficient to sustain the operation of parallel compressor 26. However, if $CO_2$ refrigeration system 100 does not produce enough $CO_2$ refrigerant gas to sustain the operation of parallel compressor 26, pressure controller 55 may regulate the pressure within receiver 6 by directing the $CO_2$ refrigerant gas through gas bypass valve 8 to be compressed by MT compressors 14. If $CO_2$ refrigeration system 100 begins producing enough $CO_2$ refrigerant gas to sustain the operation of parallel compressor 26, pressure controller 55 may close gas bypass valve 8 and activate parallel compressor 26.

Pressure controller 55 may determine whether $CO_2$ refrigeration system 100 produces enough $CO_2$ refrigerant gas to sustain the operation of parallel compressor 26 by comparing a process variable to a switchover setpoint. The process variable may be any variable received as a feedback from $CO_2$ refrigeration system 100 including, for example, the pressure of the $CO_2$ refrigerant within receiver 6, the flow rate of the $CO_2$ refrigerant through gas bypass valve 8, or the position of gas bypass valve 8. Once the process variable exceeds the switchover setpoint for a predetermined amount of time, pressure controller 55 may close gas bypass valve 8 and activate parallel compressor 26. Advantageously, the switchover setpoint may be determined automatically by switchover optimizer 56 (described in greater detail with reference to FIG. 3). In order to transition back to the use of MT compressors 14 to compress the $CO_2$ refrigerant gas from receiver 6, pressure controller 55 may compare the pressure within receiver 6 to a pressure setpoint. The pressure setpoint may be the same as the switchover setpoint or may be different from the switchover setpoint. Once the pressure of the $CO_2$ refrigerant gas within receiver 6 drops below the pressure setpoint, pressure controller 55 may deactivate parallel compressor 26 and operate gas bypass valve 8 to control the pressure within receiver 6.

Still referring to FIG. 2, controller 50 is shown to include a condenser approach controller 57. Condenser approach controller 57 can be configured to operate condenser fan 35 to maintain the condenser approach temperature at or below an approach setpoint. The condenser approach temperature may be defined as the difference between the temperature of the $CO_2$ refrigerant exiting gas cooler/condenser 2 (i.e., the temperature measured by temperature sensor 33) and the temperature of the ambient air used to provide cooling for the $CO_2$ refrigerant in gas cooler/condenser 2 (i.e., the airflow controlled by operating condenser fan 35). The temperature of the ambient air may be measured by temperature sensor 37. If the condenser approach temperature is greater than the approach setpoint, condenser approach controller 57 may increase the speed of condenser fan 35 to provide more cooling for the $CO_2$ refrigerant in gas cooler/condenser 2. However, if the approach temperature is less than or equal to the approach setpoint, condenser approach controller 57 may maintain condenser fan 35 at its current speed. Advantageously, the approach setpoint may be determined automatically by condenser approach optimizer 58 (described in greater detail with reference to FIG. 4).

Switchover Setpoint Optimization

Figure 3:
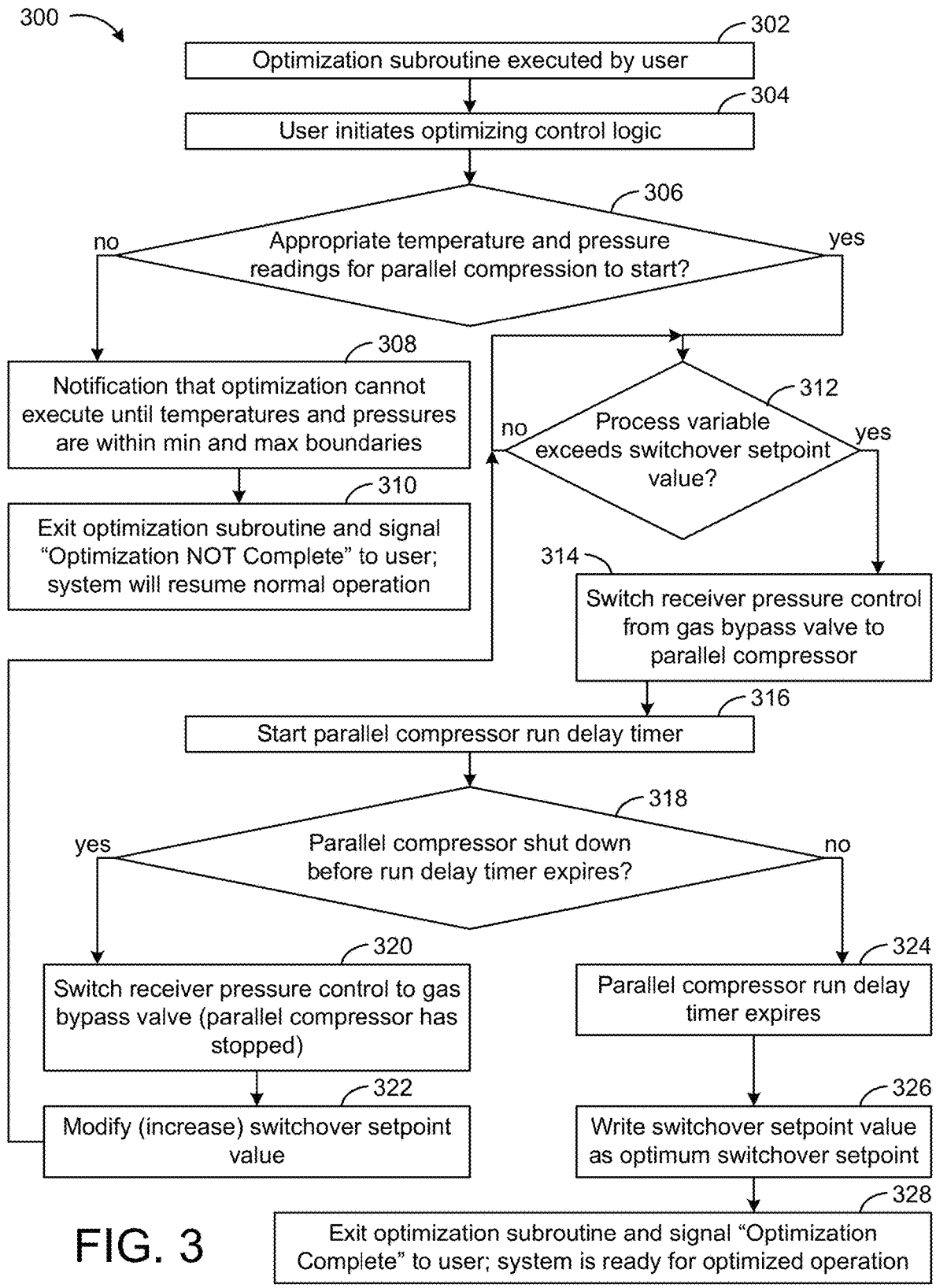
FIG. 3 is a flowchart of a process for determining an optimal pressure control switchover setpoint for use in the $CO_2$ refrigeration system of FIG. 1, according to an exemplary embodiment.

Referring now to FIGS. 2 and 3, controller 50 is shown to include a switchover optimizer 56. Switchover optimizer 56 can be configured to determine an optimal value for the switchover setpoint provided to pressure controller 55. In some embodiments, switchover optimizer 56 performs process 300 (shown in FIG. 3) to determine the optimal value for the switchover setpoint.

Process 300 begins when the optimization subroutine is executed by a user (step 302) and the user initiates the optimizing control logic (step 304). Switchover optimizer 56 may determine whether appropriate temperature and pressure readings (measured by sensors 31-34 and 37-38) are present for parallel compression to start (step 306). Appropriate temperature and pressure readings should fall within min and max operating values in order for parallel compressor 26 to successfully start.

If the temperature and pressure readings do not fall within the min and max operating values (i.e., the result of step 306 is "no"), switchover optimizer 56 may generate a notification that the optimization cannot execute until temperatures and pressures are within min and max boundaries (step 308). Switchover optimizer 56 may then exit the optimization subroutine and signal "Optimization NOT Complete" to the user (step 310). $CO_2$ refrigeration system 100 may then resume normal operation. If at any point during process 300, the temperature and pressure readings in the system fall out of the min and max operating values, the optimization subroutine may stop and exit, notifying the user that the system has not completed the optimization routine but the system will operate as normal.

If the temperature and pressure readings fall within the min and max operating values (i.e., the result of step 306 is "yes"), switchover optimizer 56 may determine whether the process variable (e.g., pressure within receiver 6, position of gas bypass valve 8, refrigerant flow rate through gas bypass valve 8, etc.) exceeds a switchover setpoint value (step 312). Initially, the switchover setpoint value may be set to a default or initial value, which can be optimized by performing the subsequent steps of process 300. If the process variable does not exceed the switchover setpoint value (i.e., the result of step 312 is "no"), switchover optimizer 56 may wait until the criterion in step 312 is satisfied. However, if the process variable does exceed the switchover setpoint value (i.e., the result of step 312 is "yes"), switchover optimizer 56 may switch the receiver pressure control from gas bypass valve 8 to parallel compressor 26 (step 314). Step 314 may include closing gas bypass valve 8 and activating parallel compressor 26.

Upon activating parallel compressor 26, switchover optimizer 56 may start a parallel compressor run delay timer (step 316) and determine whether a shutdown of parallel compressor 26 occurs before the run delay timer expires (step 318). A shutdown of parallel compressor 26 may occur when the amount of $CO_2$ refrigerant gas being produced by $CO_2$ refrigeration system 100 is insufficient to sustain the operation of parallel compressor 26. For example, pressure controller 55 may shutdown parallel compressor 26 when the pressure within receiver 6 drops below a pressure setpoint.

If the shutdown of parallel compressor 26 occurs before the run delay timer expires (i.e., the result of step 318 is "yes"), switchover optimizer 56 may switch the receiver pressure control from parallel compressor 26 to gas bypass valve 8 (step 320). Switchover optimizer 56 may then modify (increase) the switchover setpoint value (step 322) and process 300 may return to step 312. Increasing the switchover setpoint value in step 322 will require a greater value of the process variable to trigger a switchover to parallel compressor 26 in step 312. Accordingly, it will be less likely that the amount of $CO_2$ refrigerant gas being produced by $CO_2$ refrigeration system 100 is insufficient to sustain the operation of parallel compressor 26 for at least the duration of the compressor run delay timer next time steps 312-318 are performed. Steps 312-322 can be repeated as many times as necessary to cause parallel compressor 26 to remain active for at least the duration of the run delay timer in step 318.

If the shutdown of parallel compressor 26 does not occur before the run delay timer expires (i.e., the result of step 318 is "no"), switchover optimizer 56 may wait until the run delay timer expires (step 324) and write the switchover setpoint value as the optimum switchover setpoint (step 326). Switchover optimizer 56 may then exit the optimization subroutine and signal "Optimization Complete" to the user (step 328). $CO_2$ refrigeration system 100 may then be ready for optimized operation.

Condenser Approach Optimization

Figure 4:
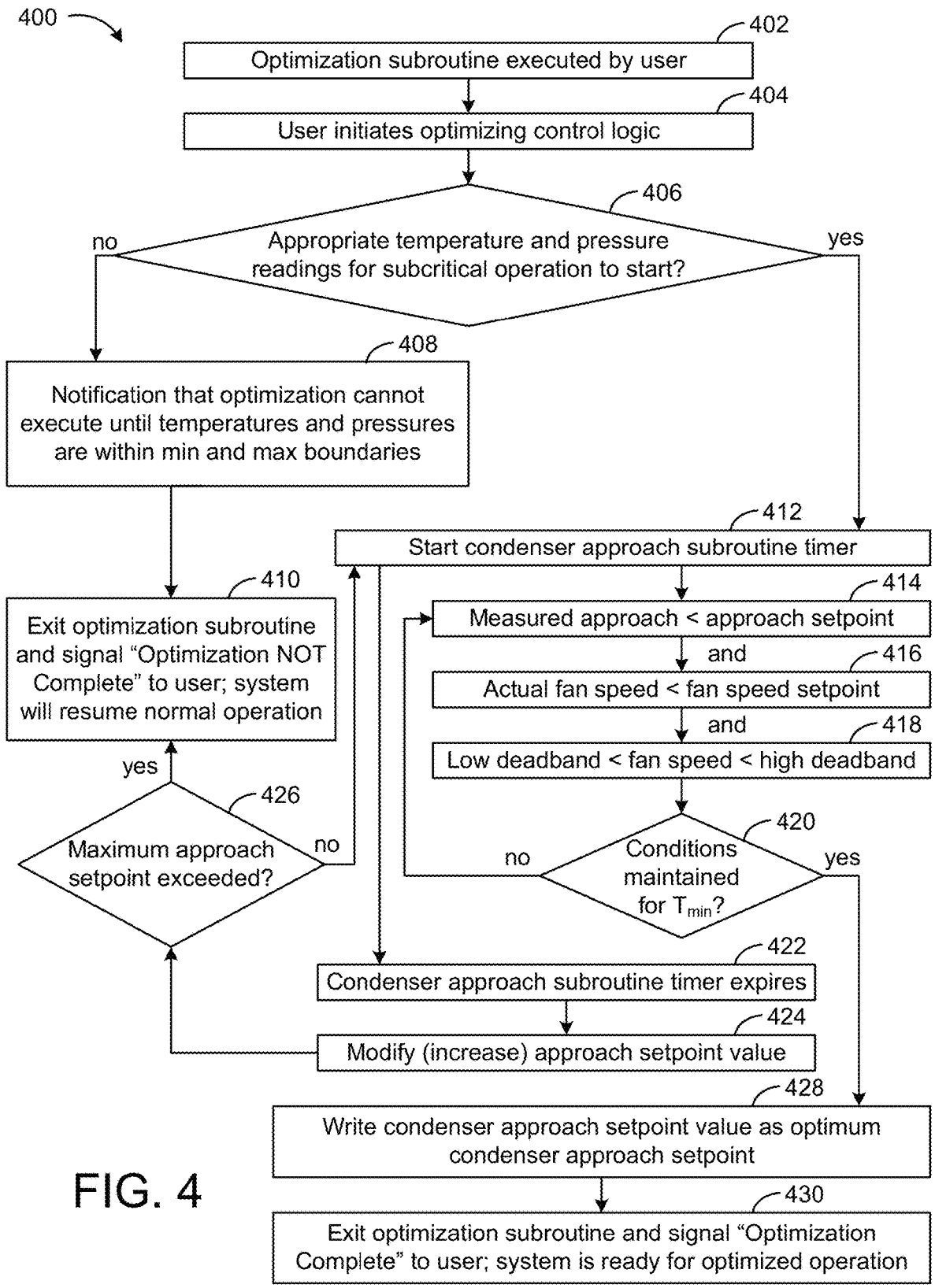
FIG. 4 is a flowchart of a process for determining an optimal condenser approach temperature setpoint for use in the $CO_2$ refrigeration system of FIG. 1, according to an exemplary embodiment.

Referring now to FIGS. 2 and 4, controller 50 is shown to include a condenser approach optimizer 58. Condenser approach optimizer 58 can be configured to determine an optimal value for the approach setpoint provided to condenser approach controller 57. In some embodiments, condenser approach optimizer 57 performs process 400 (shown in FIG. 4) to determine the optimal value for the condenser approach setpoint.

Process 400 begins when the optimization subroutine is executed by a user (step 402) and the user initiates the optimizing control logic (step 404). Condenser approach optimizer 58 may determine whether appropriate temperature and pressure readings (measured by sensors 31-34 and 37-38) are present for subcritical operation to start (step 406). Appropriate temperature and pressure readings should fall within min and max operating values in order for gas cooler/condenser 2 to operate in a subcritical mode.

If the temperature and pressure readings do not fall within the min and max operating values (i.e., the result of step 406 is "no"), condenser approach optimizer 58 may generate a notification that the optimization cannot execute until temperatures and pressures are within min and max boundaries (step 408). Condenser approach optimizer 58 may then exit the optimization subroutine and signal "Optimization NOT Complete" to the user (step 410). $CO_2$ refrigeration system 100 may then resume normal operation. If at any point during process 400, the temperature and pressure readings in the system fall out of the min and max operating values, the optimization subroutine may stop and exit, notifying the user that the system has not completed the optimization routine but the system will operate as normal.

If the temperature and pressure readings fall within the min and max operating values (i.e., the result of step 406 is "yes"), condenser approach optimizer 58 may start a condenser approach subroutine timer (step 412). Condenser approach optimizer 58 may then check whether several conditions 414-418 are maintained continuously for at least a minimum amount of time $T_{min}$ (step 420). In various embodiments, the minimum amount of time $T_{min}$ may be shorter than the duration of the condenser approach subroutine timer or equal to the duration of the condenser approach subroutine timer. Condition 414 is satisfied if the measured approach (i.e., the measured difference between the temperature of the $CO_2$ refrigerant exiting gas cooler/condenser 2 and the ambient air temperature) is less than an approach setpoint. The temperature of the $CO_2$ refrigerant exiting gas cooler/condenser 2 may be measured by temperature sensor 33, whereas the ambient air temperature may be measured by temperature sensor 37. Initially, the approach setpoint may have a default or initial value, which can be optimized by performing the subsequent steps of process 400. Condition 416 is satisfied if the actual speed of condenser fan 35 is less than a fan speed setpoint. The fan speed setpoint may be defined by a user or otherwise provided as an input to process 400. Condition 418 is satisfied if the actual speed of condenser fan 35 is between a low deadband fan speed value and a high deadband fan speed value.

If any of conditions 414-418 are not continuously maintained (i.e., any of conditions 414-418 become false) before the condenser approach subroutine timer has expired (i.e., the result of step 420 is "no"), condenser approach optimizer 58 may wait until all of conditions 414-418 are satisfied and repeat step 420. Step 420 may be repeated as many times as necessary until either all of conditions 414-418 are maintained for at least the minimum amount of time $T_{min}$ or the condenser approach subroutine timer has expired.

If the condenser approach subroutine timer expires (step 422) before all of conditions 414-418 are maintained for at least the minimum amount of time $T_{min}$, condenser approach optimizer 58 may increase the approach setpoint value (step 424) and check whether the approach setpoint value exceeds a maximum approach setpoint (step 426). If the maximum approach setpoint is exceeded (i.e., the result of step 426 is "yes"), condenser approach optimizer 58 may exit the optimization subroutine and signal "Optimization NOT Complete" to the user (step 410). $CO_2$ refrigeration system 100 may then resume normal operation. However, if the maximum approach setpoint is not exceeded (i.e., the result of step 426 is "no"), condenser approach optimizer 58 may return to step 412. Steps 412-426 may be repeated as many times as necessary until either all of conditions 414-418 are maintained for at least the minimum amount of time $T_{min}$ in step 420 or the maximum approach setpoint is exceeded in step 426.

If all of conditions 414-418 are continuously maintained (i.e., all of conditions 414-418 remain true) for at least the minimum amount of time $T_{min}$ before the condenser approach subroutine timer has expired (i.e., the result of step 420 is "yes"), condenser approach optimizer 58 may write the condenser approach setpoint value as the optimum condenser approach setpoint (step 428). Condenser approach optimizer 58 may then exit the optimization subroutine and signal "Optimization Complete" to the user (step 430). $CO_2$ refrigeration system 100 may then be ready for optimized operation.

Condenser Approach Verification

Figure 5:
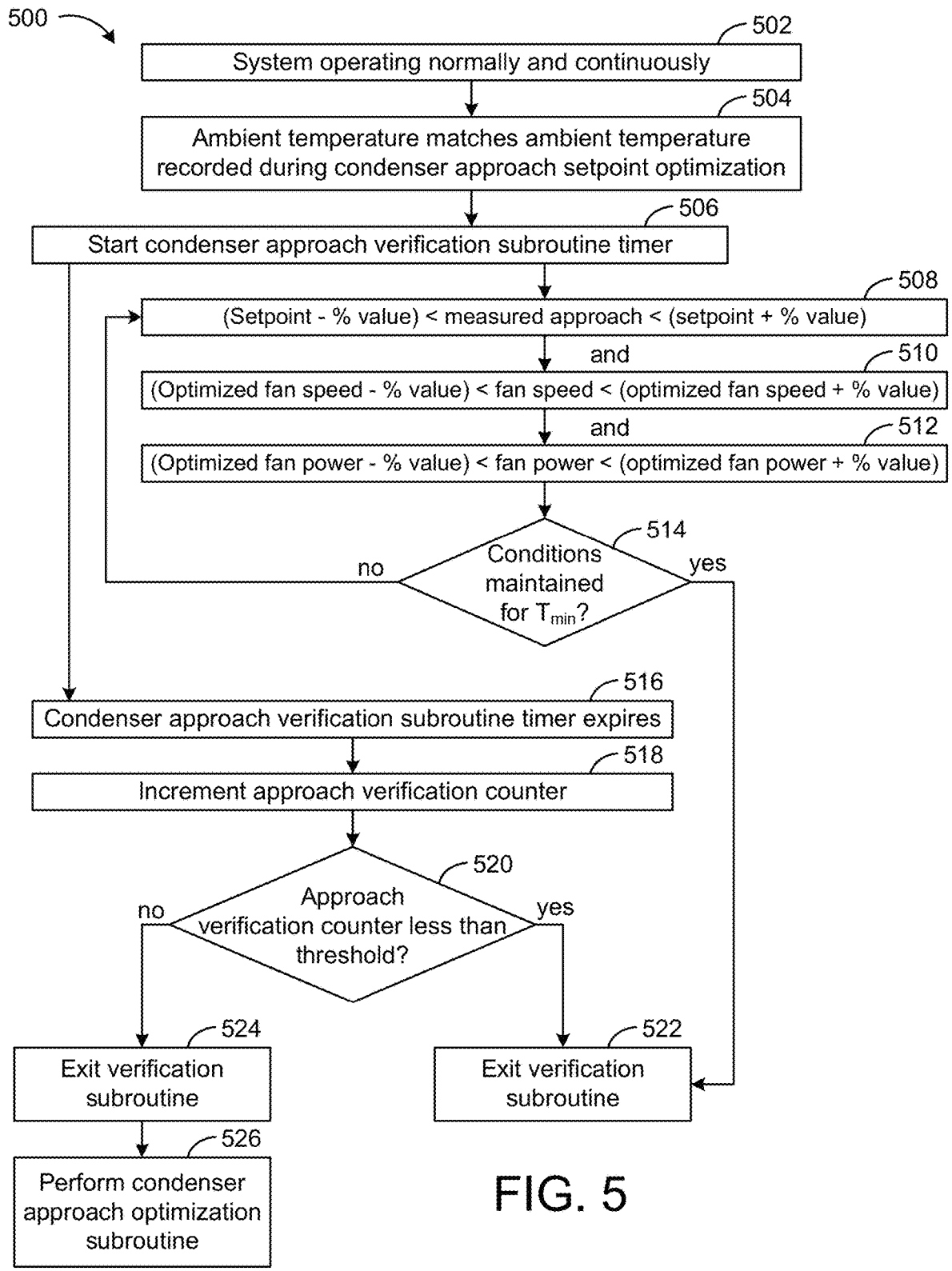
FIG. 5 is a flowchart of a process for verifying the optimal condenser approach temperature setpoint determined using the process of FIG. 3, according to an exemplary embodiment.

Referring now to FIG. 5, a flowchart of a process 500 for monitoring and verifying condenser approach is shown, according to an exemplary embodiment. Process 500 may be performed by controller 50 after condenser approach optimization process 400 is performed to ensure that $CO_2$ refrigeration system 100 continues to operate as expected. When process 400 has been successfully completed, controller 50 may record the optimized approach setpoint and the corresponding values for the fan speed (i.e., the optimized fan speed) and the fan power (i.e., the optimized fan power). Such variables can be stored in memory and used during process 500. Process 500 may be performed when $CO_2$ refrigeration system 100 is operating normally and continuously (condition 502) and when the ambient temperature matches the ambient temperature recorded when performing condenser approach optimization process 400 (condition 504).

When both conditions 502-504 are satisfied, controller 50 may start a condenser approach verification subroutine timer (step 506). Controller 50 may then check whether several conditions 508-512 are maintained continuously for at least a minimum amount of time $T_{min}$ (step 514). The temperature of the $CO_2$ refrigerant exiting gas cooler/condenser 2 may be measured by temperature sensor 33 and the ambient air temperature may be measured by temperature sensor 37. Condition 508 is satisfied if the measured approach (i.e., the measured difference between the temperature of the $CO_2$ refrigerant exiting gas cooler/condenser 2 and the ambient air temperature) is maintained at the optimal condenser approach setpoint plus or minus a predetermined percentage of the approach setpoint (i.e., (Setpoint−% value)<measured approach<(setpoint+% value)). Condition 510 is satisfied if the measured fan speed is maintained at the optimal fan speed plus or minus a predetermined percentage of the optimal fan speed (i.e., (optimized fan speed−% value)<fan speed<(optimized fan speed+% value)). Condition 512 is satisfied if the measured fan speed is maintained at the optimal fan power plus or minus a predetermined percentage of the optimal fan power (i.e., (optimized fan power−% value)<fan power<(optimized fan power+% value)).

If any of conditions 508-512 are not continuously maintained (i.e., any of conditions 508-512 become false) before the condenser approach verification subroutine timer has expired (i.e., the result of step 514 is "no"), controller 50 may wait until all of conditions 508-512 are satisfied and repeat step 514. Step 514 may be repeated as many times as necessary until either all of conditions 508-512 are maintained for at least the minimum amount of time $T_{min}$ or the condenser approach verification subroutine timer has expired. If all of conditions 508-512 are continuously maintained (i.e., all of conditions 508-512 remain true) for at least the minimum amount of time $T_{min}$ before the condenser approach subroutine timer has expired (i.e., the result of step 514 is "yes"), controller 50 may exit the verification subroutine (step 522).

If the condenser approach verification subroutine timer expires (step 516) before all of conditions 508-512 are maintained for at least the minimum amount of time $T_{min}$, controller 50 may increment an approach verification counter (step 518) and check whether the approach verification counter is less than a threshold (step 520). If the approach verification counter is less than the threshold (i.e., the result of step 520 is "yes"), controller 50 may exit the verification subroutine (step 522). However, if the approach verification counter is not less than the threshold (i.e., the result of step 520 is "no"), controller 50 may exit the verification subroutine (step 524) and perform the condenser approach optimization subroutine (i.e., process 400) to update the optimized values used in conditions 508-512.

Configuration of Exemplary Embodiments

The construction and arrangement of the $CO_2$ refrigeration system as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A refrigeration system comprising:
    a gas cooler/condenser configured to remove heat from a refrigerant flowing through the gas cooler/condenser and comprising an outlet through which the refrigerant exits the gas cooler/condenser;
    at least one fan operable to cause airflow across the gas cooler/condenser and configured to operate at multiple different fan speeds to modulate an amount of heat removed from the refrigerant flowing through the gas cooler/condenser; and
    a controller configured to:
        calculate a condenser approach temperature based on a temperature of the refrigerant exiting the gas cooler/condenser and a temperature of the airflow caused by the fan;
        operate the fan to modulate the amount of heat removed from the refrigerant flowing through the gas cooler/condenser to maintain the condenser approach temperature at or below a condenser approach setpoint; and
        automatically adjust the condenser approach setpoint in response to the amount of heat removed from the refrigerant being insufficient to maintain the condenser approach temperature at or below the condenser approach setpoint.

2. The refrigeration system of claim 1, wherein the controller is configured to calculate the condenser approach temperature by subtracting the temperature of the airflow caused by the fan from the temperature of the refrigerant exiting the gas cooler/condenser.

3. The refrigeration system of claim 1, wherein automatically adjusting the condenser approach setpoint comprises performing an approach setpoint adjustment process comprising:
starting a condenser approach subroutine timer;
monitoring the condenser approach temperature and a fan speed of the fan after starting the condenser approach subroutine timer;
automatically increasing the condenser approach setpoint to an adjusted condenser approach setpoint in response to the condenser approach temperature and the fan speed failing to maintain predetermined conditions for at least a minimum amount of time before the condenser approach subroutine timer expires; and
repeating the starting, monitoring, and automatically increasing steps until the condenser approach temperature and the fan speed maintain predetermined conditions for at least the minimum amount of time before the condenser approach subroutine timer expires.

4. The refrigeration system of claim 3, wherein the predetermined conditions comprise at least one of:
the condenser approach temperature being less than the condenser approach setpoint;
the fan speed being less than a fan speed setpoint; and
the fan speed being between a low deadband value and a high deadband value.

5. The refrigeration system of claim 3, wherein the approach setpoint adjustment process comprises writing the adjusted condenser approach setpoint as an optimum condenser approach setpoint in response to the condenser approach temperature and the fan speed maintaining the predetermined conditions for at least the minimum amount of time.

6. The refrigeration system of claim 3, wherein the approach setpoint adjustment process further comprises:
determining whether the adjusted condenser approach setpoint exceeds a maximum approach setpoint after automatically increasing the condenser approach setpoint to the adjusted condenser approach setpoint; and
restarting the condenser approach subroutine timer in response to the adjusted condenser approach setpoint not exceeding the maximum approach setpoint.

7. The refrigeration system of claim 6, wherein the approach setpoint adjustment process further comprises terminating the approach setpoint adjustment process in response to the condenser approach subroutine timer in response to the adjusted condenser approach setpoint exceeding the maximum approach setpoint.

8. The refrigeration system of claim 3, wherein the controller is configured to:
determine whether the gas cooler/condenser is operating in a subcritical mode; and
execute the approach setpoint adjustment process in response to determining that the gas cooler/condenser is operating in the subcritical mode.

9. The refrigeration system of claim 1, wherein the controller is configured to:
obtain a measurement of an ambient air temperature that occurs while automatically adjusting the condenser approach setpoint; and
store an association between the condenser approach setpoint that results from automatically adjusting the condenser approach setpoint and the measured ambient air temperature.

10. The refrigeration system of claim 9, wherein the controller is configured to, in response to a current ambient air temperature matching the measured ambient air temperature associated with the condenser approach setpoint:
start a condenser approach verification subroutine timer;
monitor the condenser approach temperature and a fan speed of the fan; and
verify that the condenser approach temperature and the fan speed maintain predetermined conditions for at least a minimum amount of time before the condenser approach verification subroutine timer expires.

11. The refrigeration system of claim 4, wherein the controller is configured to:
determine that at least one of the predetermined conditions is not met;
wait a time duration in response to determining that at least one of the predetermined conditions is not met; and
subsequent to the time duration, determine that all of the predetermined conditions are met for the minimum amount of time before the condenser approach verification subroutine timer expires.

12. The refrigeration system of claim 11, wherein the controller is configured to write the adjusted condenser approach setpoint as an optimum condenser approach setpoint in response to the predetermined conditions being met, subsequent to the time duration, and at least the minimum amount of time before the condenser approach subroutine timer expires.

13. The refrigeration system of claim 10, wherein the controller is configured to verify that the system is operating normally and continuously prior to starting the condenser approach verification subroutine timer.

14. The refrigeration system of claim 13, wherein the controller is configured to verify that a current ambient air temperature matches the measurement of the ambient air temperature that occurs while automatically adjusting the condenser approach setpoint prior to starting the condenser approach verification subroutine timer.

15. The refrigeration system of claim 10, wherein the predetermined conditions comprise:
a measured approach temperature between a temperature of the refrigerant exiting the gas cooler/condenser and the ambient air temperature is equal or substantially equal to an optimum condenser approach setpoint;
a measured fan speed is equal or substantially equal to an optimum fan speed of the fan; and
the measured fan speed is equal or substantially equal to an optimal fan power.

16. The refrigeration system of claim 15, wherein the controller is configured to:
determine that at least one of the predetermined conditions is not met;
wait a time duration in response to determining that at least one of the predetermined conditions is not met; and
subsequent to the time duration, determine that all of the predetermined conditions are met for the minimum amount of time before the condenser approach verification subroutine timer expires.

17. The refrigeration system of claim 10, wherein, when the condenser approach verification subroutine timer expires, the controller is configured to:

increment an approach verification counter;

determine that the approach verification counter is greater than a threshold; and execute a condenser approach optimization subroutine.

18. The refrigeration system of claim 17, wherein the controller is configured to execute the condenser approach optimization subroutine:

calculate the condenser approach temperature based on the temperature of the refrigerant exiting the gas cooler/condenser and the temperature of the airflow caused by the fan;

operate the fan to modulate the amount of heat removed from the refrigerant flowing through the gas cooler/condenser to maintain the condenser approach temperature at or below the condenser approach setpoint; and automatically adjust the condenser approach setpoint in response to the amount of heat removed from the refrigerant being insufficient to maintain the condenser approach temperature at or below the condenser approach setpoint.

19. The refrigeration system of claim 17, wherein, when the condenser approach verification subroutine timer expires, the controller is configured to:

determine that the approach verification counter is less than the threshold; and exit a condenser approach verification subroutine.

20. The refrigeration system of claim 1, wherein the refrigerant comprises carbon dioxide.

* * * * *